United States Patent [19]

Murakami et al.

[11] 4,357,431

[45] Nov. 2, 1982

[54] BALL-POINT PEN INK COMPOSITION ERASABLE BY RUBBER ERASER

[75] Inventors: Nobuyuki Murakami, Soka; Hiroshi Miyashita, Koshigaya, both of Japan

[73] Assignee: Pentel Kabushiki Kaisha, Tokyo, Japan

[21] Appl. No.: 280,015

[22] PCT Filed: Dec. 22, 1980

[86] PCT No.: PCT/JP80/00318

§ 371 Date: Jun. 24, 1981

§ 102(e) Date: Jun. 24, 1981

[87] PCT Pub. No.: WO81/01858

PCT Pub. Date: Jul. 9, 1981

[51] Int. Cl.$^3$ .............................................. C09D 13/00
[52] U.S. Cl. ...................................... 523/161; 106/22; 106/31; 106/32.5; 524/275; 524/277; 524/474; 524/570

[58] Field of Search .......................... 106/31, 32.5, 22; 260/28.5 A; 523/161; 524/275, 277, 474, 570

[56] References Cited

U.S. PATENT DOCUMENTS

| | | | |
|---|---|---|---|
| 3,875,105 | 4/1975 | Daugherty et al. | 106/32 |
| 4,097,290 | 6/1978 | Muller et al. | 106/30 |
| 4,158,571 | 6/1979 | Lynch et al. | 260/28.5 A |

*Primary Examiner*—Melvyn I. Marquis
*Attorney, Agent, or Firm*—Wenderoth, Lind & Ponack

[57] ABSTRACT

A ball-point pen ink composition comprising at least a polymeric substance selected form a group consisting of polyisobutylene and ethylene-propylene copolymer, a wax which is solid or semi-solid at room temperature, pigment particles and a low-boiling solvent having a boiling point lower than 200° C. This ball-point pen ink produces writing traces which can easily be erased by an ordinary rubber eraser, especially, even after passage of several days after initial writing.

2 Claims, No Drawings

BALL-POINT PEN INK COMPOSITION ERASABLE BY RUBBER ERASER

TECHNICAL FIELD

The present invention relates to a ball-point pen ink which can easily be erased by an ordinary rubber eraser.

BACKGROUND ART

Ball-point pen ink compositions which have conventionally been used comprise a dye or pigment as colorant, a resin (a ketone resin or xylene resin), a high-boiling solvent (phenyl Cellosolve, phenyl glycol, benzyl alcohol or the like) and various additives. When letters or lines are written on paper with such conventional ink, the ink permeates even in the interiors of fibers of paper and the ink dyes the fibers or is adsorbed on the fibers. Accordingly, written letters or lines cannot be erased by an ordinary rubber eraser. As means for erasing such ball-point pen ink traces, there have been adopted a chemical decomposition method in which the colorant is decomposed by oxidation and a physical method in which traces are rubbed off by a sand-incorporated rubber eraser. The chemical decomposition method, however, is defective in that the majority of colors, inclusive of colors of inks comprising a pigment as the colorant, cannot be erased and, even when certain erasable colors are employed, yellowing is caused after removal of the colors. Furthermore, the physical method is defective in that although erasing is possible, the paper surface is rubbed off at the erased part and in case of thin paper, breakage of the paper is readily caused by the erasing operation. Accordingly, no satisfactory erasing effect can be attained by any of these erasing methods.

Recently, a ball-point pen ink erasable by an ordinary rubber eraser has been developed. For example, a ball-point pen ink of this erasable type comprising a natural rubber, a low-boiling solvent, a high-boiling solvent and pigment particles as colorant is known (U.S. Pat. No. 4,097,290). Although traces of such ball-point pen ink can be erased by a rubber eraser within several hours from the time of writing, these traces, like traces of conventional ball-point pen inks, cannot be erased by a rubber eraser after passage of a few days. Furthermore, this ball-point pen ink is defective in that the speed of drying of the ink just after writing is very low and the ink is left sticky. Therefore, if other paper is placed on the written surface, both the papers adhere to each other. Moreover, since the applied ink just after writing is readily peeled from the paper surface, if traces are touched by a hand or finger just after writing, the paper surface or the hand or finger becomes dirty with the ink.

DISCLOSURE OF INVENTION

It is therefore a primary object of the present invention to provide a ball-point pen ink composition capable of providing dense and clear traces which can easily be erased by a rubber eraser even after passage of several days after writing, are not sticky at all even just after writing and do not cause adherence of papers even if other paper is placed on the written surface, and which has a good fixing property just after writing, so that even if traces are touched by a hand or finger just after writing, the hand or finger does not become dirty at all.

In accordance with the present invention, there is provided a ball-point pen ink composition erasable by a rubber eraser, which comprises, as indispensable components, at least a polymeric substance selected from a group consisting of polyisobutylene and ethylene-propylene copolymer, a wax which is solid or semi-solid at room temperature, pigment particles and a low-boiling solvent having a boiling point lower than 200° C.

The polyisobutylene or ethylene-propylene copolymer that is used in the present invention (hereinafter referred to as "polymeric substance") not only acts as a film-forming substance but also exerts a function of covering the surfaces of pigment particles and preventing the pigment particles from permeating into the interiors of fibers of paper. Since such polymeric substance is poor in the adhesiveness and contains no unsaturated bond in the chemical structure thereof, the polymeric substance is chemically stable. The polymeric substance having such functions and properties plays a very important role in maintaining a good erasability in the ink composition of the present invention.

As the polymeric substance in the present invention, it may be possible to use polyisobutylene or ethylene-propylene copolymer alone, or to use a mixture of them.

As the wax which is solid or semi-solid at room temperature, there can be used, for example, animal waxes such as bees wax, vegetable waxes such as carnauba wax, and petroleum waxes such as petrolatum and paraffin wax. Furthermore, a paraffinic hydrocarbon which is solid or semi-solid at room temperature is included in the wax referred to in the instant specification. The wax employed in the present invention acts as a peeling assistant, and it is considered that the wax forms a peelable layer between the paper surface and the polymeric substance and the wax causes cohesion in the polymeric substance to weaken the adhesive force thereof. Accordingly, a good balance can be produced between the erasability and fixing property of the ink by adjusting the mixing ratio of the polymeric substance and wax, with the result that traces are not peeled on rubbing with a hand or finger but they are peeled when they are rubbed with a rubber eraser and they are adsorbed on waste of the rubber eraser. Accordingly, traces of the ink of the present invention can be erased without contamination of the paper surface. Moreover, since the wax used in the present invention is solid or semi-solid at room temperature, traces are not sticky at all even just after writing. From the viewpoint of maintenance of a good balance between the erasability and fixing property of the ink composition, it is preferred that the wax be used in an amount of 20 to 60 parts by weight per 100 parts by weight of the polymeric substance. If the amount of the wax is smaller than 20 parts by weight per 100 parts by weight of the polymeric substance, the peelability is insufficient and no good erasability can be realized. If the amount of the wax is larger than 60 parts by weight per 100 parts by weight of the polymeric substance, the fixing property is reduced and the density of traces becomes too low.

Any of solvents having a boiling point lower than 200° C. and being capable of dissolving the polymer substance therein can be used as the low-boiling solvent in the present invention. For example, there are preferably used benzene (having a boiling point of 80.1° C.), toluene (having a boiling point of 110.6° C.), xylene (having a boiling point of about 140° C.), n-heptane (having a boiling point of 98.4° C.), cyclohexane (having a boiling point of 80.7° C.) and methylcyclohexane (having a boiling point of 100.9° C.). These solvents may be used singly or in the form of a mixture of two or more of them. This solvent exerts a diluting effect of producing a viscosity (500 to 15000 poises) suitable for extruding the ink smoothly from the pen point, and since the boiling point of the solvent is low, the solvent evaporates before permeation of the ink in the interior of paper at the time of writing, so that the solvent system is changed to cause cohesion of the polymeric substance and reduce the adhesiveness of the ink. This results the improved erasability. It is preferred that the solvent be used in an amount of 70 to 300 parts by weight per 100 parts by weight of the polymeric substance. If the amount of the solvent is smaller than 70 parts by weight per 100 parts by weight of the polymeric substance, the viscosity of the ink is too high and no good ball-point pen ink can be obtained. If the amount of the solvent is larger than 300 parts by weight per 100 parts by weight of the polymeric substance, a long time is required for completing evaporation of the solvent in traces, and therefore, a slight amount of the ink is allowed to permeate in the interior of paper to reduce the erasability and it sometimes become impossible to completely remove the traces.

Pigment particles are employed as the colorant of the ball-point pen ink. Particles of organic and inorganic pigments having a particle size of 0.01 to $5\mu$ are preferably used in the present invention. Pigment particles having a particle size smaller than $0.01\mu$ are defective in that when certain papers, for example, straw paper or drawing paper having a rough surface, are used, the pigment particles intrude in the interior of paper through cappilary tubes of paper fibers and it becomes difficult to remove traces by rubbing with a rubber eraser. If the particle size of the pigment particles is larger than $5\mu$, the ink is not allowed to smoothly extrude between a ball and a tip at the top point of a ball-point pen, and the ink readily breaks off or rotation of the ball is often inhibited, with the result that the graphic property is reduced. It is generally preferred that the pigment be used in an amount of 50 to 150 parts by weight per 100 parts by weight of the polymeric substance, although it may be varied depending upon kinds of pigment colors. If the amount of the pigment is smaller than 50 parts by weight per 100 parts by weight of the polymeric substance, the density of traces is low, and if the amount of the pigment is larger than 150 parts by weight per 100 parts by weight of the polymeric substance, an undesirable phenomenon of separation of the pigment alone from traces is often observed.

As the organic pigments that are preferably used in the present invention, there can be mentioned, for example, C.I. (color index) Pigment Yellow—1, —2, —3, —5, —12, —13, —14, —15, —17 and —83; C.I.Vat Yellow—1; C.I.Pigment Orange—1, —5, —13, —16, —17 and —24; C.I.Vat Orange—3; C.I.Pigment Red—1, —2, —3, —4, —5, —7, —9, —12, —22, —23, —37, —38, —48 Calcium Lake, —49 Barium Lake, —50, —51, —53 Barium Lake, —57 Calcium Lake, —58 Manganese Lake, —60 Barium Lake, —63 Calcium Lake, —63 Manganese Lake, —81, —83 Aluminum Lake, —88, —112 and —214; C.I.Pigment Violet—1, —3, —19 and —23; C.I.Vat Violet—2; C.I.Pigment Blue—1, —2, —15, —16 and —17; C.I.Vat Blue—4; C.I.Pigment Green—2, —7, —8 and —10; C.I.Pigment Brown—1, —2 and —5; C.I.Vat Brown—3; and C.I.Pigment Black—1; and etc. As the inorganic pigments that are preferably used in the present invention, there can be mentioned, for example, C.I.Pigment Yellow—34, —36, —37, —42 and —48; C.I.Pigment Orange—21; C.I.Pigment Brown—6; C.I.Pigment Red—101, —105, —106, —107 and —108; C.I.Pigment Violet—14 and —16; C.I.Pigment Blue—27, —28, —29 and —35; C.I.Pigment Green—17, —18, —19 and —21; C.I.Pigment Black—6, —7, —9 and —10; and C.I.Pigment White—1, —4 and —6; and etc.

The viscosity of the ball-point pen ink of the present invention is preferably in a range of 500 to 1500 poises. In order to provide such a range of the viscosity to the ink, the mixing ratio of each component, especially the mixing amount of the solvent, is controlled. However, even if the viscosity is suitably controlled at the preparation of the ball-point pen ink so as to produce good ink extrudability, changes of the ink viscosity due to changes of temperatures cannot be avoided. For example, in summer where the ambient temperature is high, the viscosity is reduced and the ink oozes in an unnecessarily large quantity and so-called dripping leakage is readily caused. On the ther hand, in winter where the ambient temperature is low, the viscosity is increased and the extrudability of the ink is reduced, with the result that skipping is readily caused in traces.

We have found that a stable ink extrudability can be obtained either at high temperatures or at low temperatures, by incorporating into the ball-point pen ink composition of the present invention α-olefin oligomer represented by the following general formula:

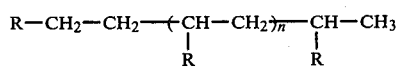

(wherein R represents a linear alkyl group having 2 to 18 carbon atoms and n is a number of from 0 to 21).

Such α-olefin oligomers are included in organic polymeric compound No. 1109, that is, hydrogenated α-olefin ($C_6$ to $C_{14}$) oligomer (2 to 23 recurring units) and organic polymeric compound No. 1470, that is, hydrogenated α-olefin ($C_4$ to $C_{10}$) oligomer (3 to 23 recurring units) in Class 6 of Nominal List of Known Chemical Substances (published by Ministry of International Trade & Industry, Japan). As typical commercially available products, there can be mentioned "Lipolub 4", "Lipolub 5" and "Lipolub 6" (each being supplied by Lion K.K.).

It is preferred that the α-olefin oligomer be incorporated in an amount of 10 to 100 parts by weight per 100 parts by weight of the polymeric substance. If the amount of the oligomer is smaller than 10 parts by weight per 100 parts by weight of the polymeric substance, the ink extrudability is reduced at low temperatures and no substantial effect can be obtained by incorporation of the oligomer. If the oligomer is incorporated in an amount larger than 100 parts by weight per 100 parts by weight of the polymeric substance, the ink extrudability is good but the drying property of writing traces is reduced.

Even when the ink viscosity is adjusted within the suitable range above-described, the degradation of the ink extrudability is sometimes observed in the relatively high viscosity. In such a case, by incorporating amorphous graphite as a lubricant into the ink composition according to need, the ink extrudability is effectively improved.

Other than the amorphous graphite, lubricants conventionally used for ball-point pen inks may be incorporated. Further, conventional additives, such as a rust preventive, an antiseptic agent and the like, may be incorporated, if necessary. Furthermore, in order to complement the ink color or control the color tone, dyes may be added to the ink composition of the present invention to the extent that the erasability is not degraded.

A preferred process for preparing the ball-point pen ink of the present invention will now be described hereinbelow.

At first, the polymeric substance is wound on an open roll through which cooling water passes and mastication is carried out. In order to improve the workability at the mastication step, it is preferred that a lubricant such as stearic acid or lauric acid be added to the polymeric substance. Then, the polymeric substance is kneaded with the pigment to uniformly disperse the pigment in the polymeric substance, and a sheet-like material is produced from the kneaded mixture. The sheet-like material is cut and a predetermined amount of the low-boiling solvent is added thereto. The mixture is allowed to stand still overnight to swell the sheet, and the mixture is sufficiently stirred to dissolve the sheet in the solvent. In order to shorten the dissolving time, it is preferred to form a thin sheet-like material and to cut the sheet-like material into small pieces. A ball-point pen ink of the present invention having a desirable color can be prepared according to the above-mentioned process by using a pigment having an appropriate color.

The thus prepared ball-point pen ink of the present invention is injected, filled and compressed in a conventional ball-point pen cartridge having a compression structure and is used for writing. Traces formed by writing with this ink can easily be erased at any time by a commercially available eraser of rubber or plastic. Since the traces are not sticky even just after writing, adherence of papers does not occur at all, even if another paper is placed on the written surface. Furthermore, since the traces have a good fixing property just after writing, even if the traces are touched by a hand or finger, the hand or finger does not become dirty at all.

BEST MODE FOR CARRYING OUT THE INVENTION

The present invention will now be described in detail with reference to the following Examples, in which all of "parts" are by weight.

EXAMPLE 1

| | |
|---|---|
| Polyisobutylene ("Oppanol B-50" having an average molecular weight of 50,000 and supplied by BASF AG.) | 100 parts |
| Stearic acid | 10 parts |
| Lauric acid | 10 parts |
| Paraffin wax (having a melting point of 50° C. and supplied by Nippon Seiro K.K.) | 50 parts |
| C.I.Pigment Black-10 ("#10B" having a particle size of 0.08μ and supplied by Mitsubishi Kasei Kogyo K.K.) | 100 parts |
| n-Heptane | 200 parts |

The polyisobutylene was wound on an open roll, and stearic acid, lauric acid, paraffin wax and C.I.Pigment Black—10 were added thereto and dispersed by kneading and the mixture was molded into a sheet having a thickness of about 5 mm. The sheet was cut into cubes having a side of about 5 mm and thrown into n-heptane, and the mixture was allowed to stand overnight and then stirred for 3 hours by using a strong stirrer to obtain a homogeneous pasty black ball-point pen ink.

When the particle size of the pigment in the so prepared ink was measured by a grindometer, it was found that there were not present particles having a particle size exceeding $2\mu$. When the viscosity of the ink was measured by a Brookfield type viscometer, it was found that the viscosity of the ink was 2000 poises.

EXAMPLE 2

| | |
|---|---|
| Ethylene-propylene copolymer ("Tafmer P-0280" supplied by Mitsui Sekiyu Kagaku Kogyo K.K.) | 100 parts |
| Stearic acid | 10 parts |
| Lauric acid | 10 parts |
| Bees wax (having a boiling point of 50° C.) | 35 parts |
| Carnauba wax (having a melting point of 80 to 86° C.) | 5 parts |
| C.I.Pigment Black-10("#10B") | 100 parts |
| n-Heptane | 200 parts |

A homogeneous pasty black ball-point pen ink was prepared by mixing the above ingredients in the same manner as described in Example 1.

As ball-point pen inks to be employed for comparative tests shown hereinbelow, ball-point pen inks were prepared according to the following compositions indicated in Comparative Examples 1 and 2.

COMPARATIVE EXAMPLE 1

| | |
|---|---|
| Polyisobutylene ("Oppanol B-50") | 100 parts |
| Stearic acid | 10 parts |
| Lauric acid | 10 parts |
| C.I.Pigment Black-10 ("#10B") | 100 parts |
| Dioctyl phthalate (DOP) | 120 parts |
| n-Heptane | 100 parts |

COMPARATIVE EXAMPLE 2

| | |
|---|---|
| Natural rubber (pale crepe) | 100 parts |
| Stearic acid | 10 parts |
| Lauric acid | 10 parts |
| C.I.Pigment Black-10 ("#10B") | 100 parts |
| Dioctyl phthalate (DOP) | 120 parts |
| n-Heptane | 100 parts |

One gram each of the ball-point pen inks prepared in Examples 1 and 2 and Comparative Examples 1 and 2 was injected, filled and compressed in pressure type ball-point pens (the inner pressure was 5 atmospheres), and writing was effected on wood free papers (writing paper A defined by JIS P-3201) with these ball-point pens. The erasability, sticking property and fixing property of traces were examined just after writing and after passage of 10 days from writing. For comparison, traces of a pencil (HB) were similarly examined. The obtained results are shown in the following Table 1. The foregoing properties were determined according to the following methods:

Erasability;
 The erasability was determined according to the test method of JIS S-6004 for evaluating the erasing capacity of a rubber eraser.
Sticking Property of Traces;

The traces were touched by a finger, and it was checked whether or not there was sticky feeling.

Fixing Property of Traces;

A filter paper (Toyo Roshi No. 2) was placed on traces and a load of 500 g was applied. The filter paper was moved to the right and left 3 times and it was checked whether or not the traces were peeled from the paper surface or the traces were expanded on the paper surface.

TABLE 1

|  | Example 1 | Example 2 | Comparative Example 1 | Comparative Example 2 | Control (Pencil) |
|---|---|---|---|---|---|
| Erasability | | | | | |
| rubber eraser | | | | | |
| just after writing | 80% | 83% | 83% | 75% | 81% |
| 10 days after writing | 81% | 81% | 81% | 70% | 80% |
| plastic eraser | | | | | |
| just after writing | 83% | 85% | 85% | 78% | 84% |
| 10 days after writing | 82% | 83% | 82% | 72% | 82% |
| Sticking Property | | | | | |
| just after writing | not observed | not observed | not observed | observed | not observed |
| 10 days after writing | not observed | not observed | not observed | slightly observed | not observed |
| Fixing Property | | | | | |
| just after writing | neither peel nor expansion | neither peel nor expansion | peel and expansion | peel and expansion | expansion |
| 10 days after writing | neither peel nor expansion | neither peel nor expansion | peel | neither peel nor expansion | expansion |

As will be understood from the results shown in the above Table 1, in the traces of the inks of Examples 1 and 2 according to the present invention, the erasability was not changed with the lapse of time and they could be erased as well as traces of the pencil by either a rubber eraser or a plastic eraser. Furthermore, traces of the inks of the present invention could be erased just after writing without contamination of the paper surface by a rubber eraser. Moreover, traces of the inks of the present invention had a good fixing property and showed no stickiness at all. In contrast, although traces of the ink of Comparative Example 1 had a good erasability comparable to those of the traces of the inks of Examples 1 and 2 because polyisobutylene was used as in the ink of the present invention, the fixing property of the traces of this comparative ink was inferior because a wax such as paraffin wax was not incorporated, and it was found that the traces were sticky just after writing. In the ink of Comparative Example 2, since natural rubber containing unsaturated bonds in the main chain of the chemical structure was used, the erasability was reduced with the lapse of time. Furthermore, the fixing property of traces of this comparative ink was poor just after writing and stickiness was observed.

EXAMPLE 3

| | |
|---|---|
| Polyisobutylene ("Oppanol B-50") | 80 parts |
| Ethylene-propylene copolymer ("Tafmer P-0280") | 20 parts |
| Stearic acid | |
| Lauric acid | 10 parts |
| Parrafin wax (having a melting point of 50° C. and supplied by Nippon Seiro K.K.) | 40 parts |
| C.I.Pigment Black-10 ("#10B") | 100 parts |
| n-Heptane | 100 parts |
| α-Olefin oligomer ("Lipolube 5" supplied by Lion K.K.) | 40 parts |

The polyisobutylene and ethylene-propylene copolymer were wound on an open roll, and the stearic acid, lauric acid, paraffin wax and pigment were added thereto and dispersed by kneading and the mixture was molded into a sheet having a thickness of about 3 mm. The sheet was cut into chips having a side of about 5 mm and immersed overnight in the n-heptane and α-olefin oligomer. The mixture was stirred for 3 hours by a strong stirrer to obtain a homogeneous pasty ball-point pen ink.

The thus prepared ink was injected, filled and compressed in a pressure type ball-point pen (the inner pressure was 5 atmospheres), and the writing test was carried out at various temperatures to examine the ink extrusion rate, the dripping leakage of the ink and the density of traces.

For comparison, a ball-point pen ink composition was similarly prepared according to the above recipe except that the α-olefin oligomer was not added. This ink was similarly tested and the obtained results are shown in Table 2.

TABLE 2

| | Writing Temperature | | |
|---|---|---|---|
| | 5° C. | 20° C. | 50° C. |
| **Ink Extrusion Rate*1** (g/100m) | | | |
| Example 3 | 0.027 | 0.030 | 0.032 |
| Comparison | 0.010 | 0.025 | 0.043 |
| **Dipping Leakage of Ink*2** (spots/100m) | | | |
| Example 3 | no spot | no spot | 4 spots |
| Comparison | no spot | 2 spots | 10 spots |
| **Trace Density*3** (%) | | | |
| Example 3 | 45 | 42 | 42 |

TABLE 2-continued

| | Writing Temperature | | |
|---|---|---|---|
| | 5° C. | 20° C. | 50° C. |
| Comparison | 58 | 46 | 33 |

Notes
*¹Ink Extrusion Rate
Writing was carried out by using a spiral line drawing tester and after writing was conducted under the following conditions along 100 m, the amount of ink extruded was determined.
Writing speed; 7 cm/sec.
Writing load; 100 g
Writing angle; 70°
Paper; wood free paper (writing paper A defined by JIS P-3201)
*²Dipping Leakage of Ink
In the above-mentioned ink extrusion rate test, the number of spots of the dripping leakage of the ink was counted.
*³Trace Density
Writing was carried out along a width of 1 mm and a length of 100 m by means of a line drawing tester, and the color of the test piece was measured by a Hunter color difference meter using a Y value. It can be said that the higher is the trace density, the better is the ink extrudability.

As will be understood from the results shown in Table 2, a good ink extrusion rate can be obtained stably irrespectively of temperature changes. If the ink extrusion rate is too high as observed in the ink of the comparison at 50° C., a hand or paper surface is likely contaminated with the ink. The ink extrusion rate in the comparison at 5° C. produces undesirable lower trace density. From the foregoing results, it will readily be understood that by incorporating the α-olefin oligomer into a ball-point pen ink composition, stable traces can be obtained either in summer or in winter.

We claim:

1. A ball-point pen ink composition erasable by a rubber eraser, which comprises a polymeric substance selected from the group consisting of polyisobutylene and an ethylene-propylene copolymer; a wax which is solid or semi-solid at room temperature and is selected from a group consisting of animal waxes, vegetable waxes, petroleum waxes and paraffinic hydrocarbons; pigment particles having a particle size of 0.01 to 5μ; and a low-boiling solvent having a boiling point lower than 200° C.; said wax being present in an amount of 20 to 60 parts by weight, said pigment particles being present in an amount of 50 to 150 parts by weight and said solvent being present in an amount of 70 to 300 parts by weight, per 100 parts by weight of said polymeric substance.

2. A ball-point pen ink composition according to claim 1, wherein said composition further comprises an α-olefin oligomer represented by the following general formula:

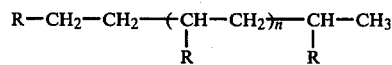

wherein R represents a linear alkyl group having 2 to 18 carbon atoms and n is a number of from 0 to 12, said oligomer being incorporated in an amount of 10 to 100 parts by weight per 100 parts by weight of said polymeric substance.

* * * * *